US008536840B2

(12) United States Patent
Walter et al.

(10) Patent No.: US 8,536,840 B2
(45) Date of Patent: Sep. 17, 2013

(54) BIDIRECTIONAL POWER CONVERTERS

(75) Inventors: William Walter, Lowell, MA (US); Sauparna Das, North Chelmsford, MA (US)

(73) Assignee: Linear Technology Corporation, Milpitas, CA (US)

(*) Notice: Subject to any disclaimer, the term of this patent is extended or adjusted under 35 U.S.C. 154(b) by 303 days.

(21) Appl. No.: 12/405,282

(22) Filed: Mar. 17, 2009

(65) Prior Publication Data

US 2010/0237840 A1    Sep. 23, 2010

(51) Int. Cl.
*G05F 1/613* (2006.01)
*G05F 3/16* (2006.01)

(52) U.S. Cl.
USPC .......................................................... 323/223

(58) Field of Classification Search
USPC .................................. 323/222, 224, 223, 344
See application file for complete search history.

(56) References Cited

U.S. PATENT DOCUMENTS

| | | | |
|---|---|---|---|
| 6,765,370 B2 | 7/2004 | Bradley | |
| 6,894,461 B1 | 5/2005 | Hack et al. | |
| 7,348,767 B2 | 3/2008 | Hack et al. | |
| 7,538,532 B2 | 5/2009 | Hack et al. | |
| 7,560,898 B1* | 7/2009 | Kranzen et al. | 320/107 |
| 7,839,128 B2 | 11/2010 | Yoshida et al. | |
| 2006/0262579 A1 | 11/2006 | Chou | |
| 2007/0139025 A1* | 6/2007 | Vinn et al. | 323/273 |
| 2007/0182388 A1* | 8/2007 | Lanni | 323/274 |
| 2008/0054855 A1* | 3/2008 | Hussain et al. | 320/162 |
| 2008/0290855 A1* | 11/2008 | Fishman | 323/318 |

OTHER PUBLICATIONS

LTC1980—Combination Battery Charger and DC/DC Converter, Linear Technology, pp. 1-16.
LTC4088—High Efficiency Battery Charger/USB Power Manager, Linear Technology, pp. 1-24.
Dave Simmons, Linear Technology Design Notes, Switching USB Power Manager with PowerPath Control Offers Fastest Charge Time with Lowest Heat, 2 pages.
Tom Hack, Linear Technology Design Notes, Shrink Battery-Powered Products with a Combination Battery Charger and DC/DC Converter, 2 pages.
SUMMIT Microelectronics—Press Release: Summit SMB138: 1.25A Programmable USB/AC Li-Ion Charger Cuts Charging Time, Heat and Size by 50%-80%, Supports USB On-The-Go, May 23, 2007, 2 pages.
Chinese Office Action, with English translation, issued in Chinese Patent Application No. 200810172079.0, mailed Jan. 26, 2011.

* cited by examiner

*Primary Examiner* — Timothy J Dole
*Assistant Examiner* — Matthew Grubb
(74) *Attorney, Agent, or Firm* — McDermott Will & Emery LLP (57) ABSTRACT

Circuits and methods for bidirectional power conversion are provided that allow mobile and other devices to generate power suitable to support multiple modes of operation. The bidirectional power converters of the present invention may operate in both step up and step down configurations rather than having a single dedicated conversion function and use many of the same components thereby reducing converter size and complexity. In some embodiments, the converter of the present invention may be used to provide a power component of a communications link, such as a USB link.

22 Claims, 7 Drawing Sheets

BIDIRECTIONAL POWER CONVERTERS

BACKGROUND OF THE INVENTION

The invention relates to bidirectional power converters. More particularly, the inventions described herein relate to systems and methods for creating bidirectional power converters that may be used to covert power in two different directions.

Power conversion circuitry may be found in virtually every device that requires electricity. The purpose of power conversion circuitry is to transfer electrical power from a power source to a load, typically through certain conditioning and regulation circuitry. A typical application of power conversion circuitry is to convert AC power, provided by a power utility, to a regulated DC voltage suitable for use with consumer electronics. Although power conversion circuits are frequently implemented as stand alone systems, often they are constructed as integrated circuits (ICs) and used in various applications such as communications and computing systems.

One type of commonly used power converter is a DC to DC converter, which changes one DC voltage level to another. A step down or buck converter, for example, provides an efficient way of converting a higher DC voltage to a lower DC voltage, which often is desirable in certain electronic systems. A laptop computer, for example, may have a battery supplying 12 volts DC and a processor which requires 5 volts DC. A step down converter, implemented as an IC with some external components, may be used to convert the 12 volt battery voltage to the 5 volts required by the processor with minimal energy loss.

Another type of DC to DC converter is a step up or boost converter. Such converters are used to increase the voltage supplied from a source to a load. For example, an LED may require 3.3 volts DC to emit light. The LED may be powered by a single 1.5 volt battery through the use of a boost converter which may step up the battery voltage to the level required by the LED. Boost converters are also used to provide the higher voltages needed to power fluorescent lights and cathode ray tubes.

In many instances, consumer electronic devices require the use of both step up and step down voltage converters. A portable communications device such as a cellular telephone or PDA is typically battery powered and has a bright, multi colored display screen. When the portable device, such as a BlackBerry, is operating under battery power, the battery voltage used to drive the display screen is stepped up through a boost converter. However, when the device is plugged into a wall socket and its battery is charging, the battery charging circuitry may rely on a buck converter to step down the voltage, in order to provide the proper charging voltage and increase current which charges the battery more quickly.

Often a PDA or other portable communications device is charged through the use of common interconnection link such as a USB link. A BlackBerry, for example, may use the power provided on the USB connection for both operating power and to charge its battery. In the multi-cell battery case where the battery voltage is greater than the voltage on the USB link, a boost converter is used to regulate the supplied voltage, which is typically set to a value just above the battery voltage in order to minimize power dissipation in the charger and to maintain the supply current within USB specifications.

Interconnection links such as a USB link, typically operate in one of two modes. In a host mode or in a slave mode. When a device such as a PDA is connected to a PC through a USB link, the PC acts as the host and provides control functions that power and manage the USB link. Conversely, the USB port in the PDA operates in the slave mode and needs the PC to provide power and to supervise communications so both devices can communicate with one another.

In some instances, however, the USB link in the PDA or other mobile device does not have the capability to operate in the host mode and drive the USB link. Although the mobile device may have the necessary controller circuitry to supervise USB communications, it does not have the capability to provide the power required to drive the USB link. This may be attributed to the voltage supplied by its battery, which, in multiple cell systems, may be significantly higher than that required by the USB link. This condition, coupled with the inability of the mobile device to convert that voltage to a level suitable to drive the USB link, prevent the mobile device from providing the power required. As a result, if the mobile device is connected to another device which may only operate as a USB slave, such as a memory stick, the mobile device cannot power the USB link, preventing these devices from communicating with one another.

Accordingly, in view of the foregoing, it would be desirable to provide circuitry and methods for bidirectional power conversion that allow mobile and other devices to generate power suitable to support multiple applications.

SUMMARY OF THE INVENTION

Circuits and methods for bidirectional power conversion are provided that allow mobile and other devices to generate power suitable to support multiple modes of operation. The bidirectional power converters of the present invention may operate in both step up and step down configurations rather than having a single dedicated conversion function and use many of the same components thereby reducing converter size and complexity.

In one embodiment of the present invention, a bi-directional power converter is provided, which operates as a step up converter in a first direction and a step down converter in a second direction and includes a reactive element for storing energy when operating in the first direction and the second direction, a plurality of switching elements for selectively coupling the one reactive element to one of two or more power sources, and mode selection circuitry for selectively coupling the bi-directional power converter to a first power source when operating as a step up converter and to a second power source when operating a step down converter, such that when the bi-directional power converter is operating as the step down converter, the bi-directional power converter is configured to deliver power to a communications link that includes a power component.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
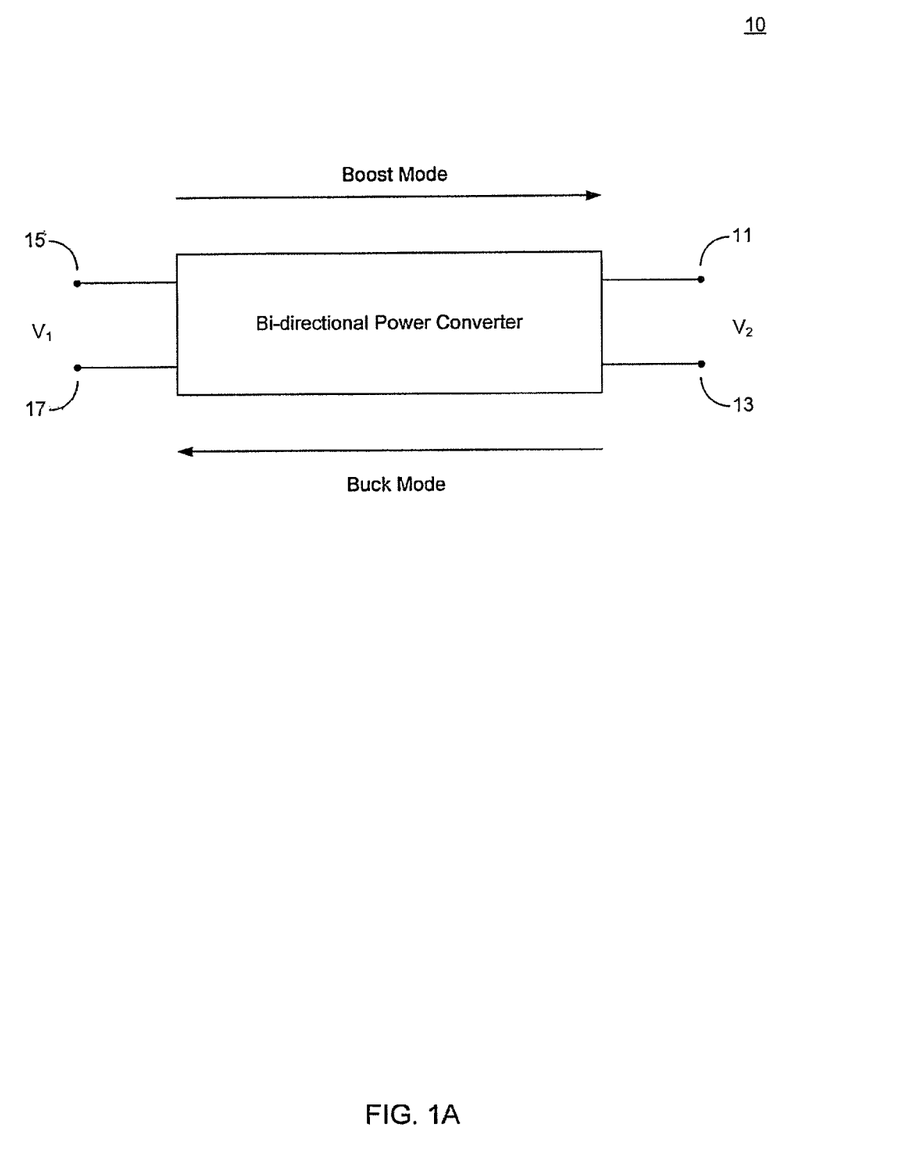
FIG. 1A is a generalized block diagram of one embodiment of a bidirectional power converter in accordance with the principles of the present invention.

A general block diagram of one embodiment of a bidirectional power converter constructed in accordance with the principles of present invention is shown in FIG. 1A. As shown, system 10 includes a bidirectional power converter which may operate in at least two modes. Such modes may include a buck mode (i.e., step down) and boost mode (i.e., step up). Converter 10 may switch from one mode of operation to another depending on where an input signal is applied. For example, converter 10 may operate as a boost converter when a voltage V1 is applied across terminals 15 and 17 (in the direction indicated by the top arrow). In this case, converter 10 steps up voltage V1 and produces an increased output voltage V2 at terminals 11 and 13. Conversely, converter 10 may operate as a buck converter when a voltage V2 is applied across terminals 11 and 13 (in the reverse direction indicated by the bottom arrow). In this case, the voltage is stepped down by converter 10 which produces and an output voltage V1 of decreased magnitude at terminals 15 and 17. Generally speaking, converter 10 operates in one of the two modes at any given time.

In a preferred embodiment of the invention, converter 10 uses many (or all) of the same components in both the buck and boost modes (described in more detail below). This is generally desirable for several reasons, including the reduction in size and complexity of the converter as well as eliminating the need to provide two separate dedicated unidirectional converters, each requiring a different set of components, to provide the same functionality. In addition, the relatively small size of converter 10 makes it ideal for implementation as an integrated circuit and thus can be readily deployed to mobile devices such as PDAs, mobile phones, digital cameras, as a stand alone converter, and in other portable rechargeable devices which require voltage conversion such as flashlights, etc.

Figure 1B:
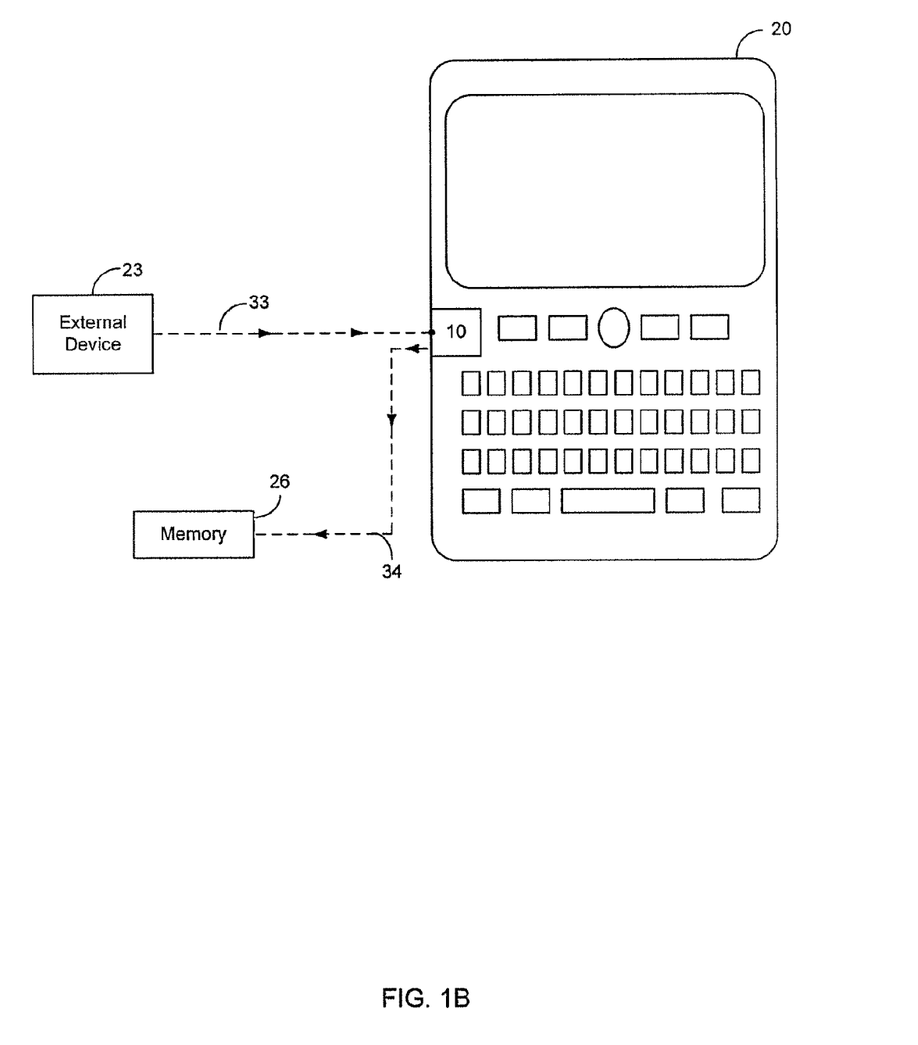
FIG. 1B is an illustrative embodiment of the bidirectional power converter of FIG. 1A deployed in a mobile device.

One application of converter 10 includes power conversion suitable for use in driving various internal and/or external applications of a mobile device. For example, in accordance with one aspect of the present invention, converter 10 may be installed on a mobile device 20 (such as a PDA) and used to perform two conversion functions. A general illustration of this is shown in FIG. 1B. One conversion function may be related to an application that may be considered an "internal" application and another may relate to what may be considered an "external" application (although other combinations are possible, such as internal or external only, multiple other conversion modes, etc.).

One internal application may include regulation of power from an external source, such as from a commonly used communications link which has a power component (e.g., a USB link). As shown in FIG. 1B, when connected to an external device 23, which provides power, converter 10 may operate in boost mode and act as a voltage regulator to provide the desired voltage level to mobile device 20 and charge its battery (through link 33, which may be a communications link, such as a USB link or any other suitable power conduit).

For example, when link 33 is a USB link from an external device 23 such as a PC, it may provide a 5 volt power component. The battery of mobile device 20, which, in some embodiments, may be constructed of two or more cells, such Li-Ion cells, may require a higher voltage to charge and power the mobile device (e.g., 8.1 volts). In this case, converter 10 may boost the 5 volts provided by the USB link to 8.1 volts in order to charge the battery and operate device 20. When the mobile device 20 is disconnected from external device 23, it relies on its battery to provide its power.

When mobile device 20 is operating on battery power, converter 10 may also be used for certain external (or other internal) applications that require a lower voltage level than that provided by the battery. For example, converter 10 may be required to produce a lower voltage to drive a communications link such as a USB link. For example, as mentioned above, mobile device 20 may be coupled to an external USB slave device, such as memory stick 26. In this case, converter 10 may act as a buck converter and step down the battery voltage from device 20 to provide the voltage necessary to drive USB link 34 and communicate with memory stick 26 through link 34. In some embodiments, the amount of down conversion may be programmable or selectable to multiple different levels to support various different applications (not shown). Thus, mobile device 20 may use converter 10 bi-directionally, i.e., to regulate and boost inbound power and for system operation and charge the internal battery, and step down internal battery voltage in the opposite direction for use with other applications, such as to provide power for a USB link.

An example of one specific implementation involving a USB bus, in accordance with an embodiment of the invention, includes configuring converter 10 to comply with the USB "On The Go" specification for driving and communicating with USB slave devices. For example, converter 10 may be installed in a digital camera and be used to drive its USB connection so it may couple to a memory stick and transfer digital image files (not shown). In this case, the camera, which is usually a slave device when coupled to a PC, becomes the host device, and supplies power via the USB link to the memory stick, and supervises communications. Thus, converter 10, operating in the buck mode, may down convert the camera battery voltage such that it supplies a voltage between about 4.75 and 5.25 volts with a rated current limit of about 500 mA to the power bus of the USB link from the camera's battery. In cases where the slave device requires less than about 100 mA, the lower voltage threshold may be reduced to about 4.4 volts.

It will be understood from the foregoing that although the power paths described above may include conventional power cables and/or a communications link such as a USB link, that any other suitable power conduit may be used, if desired. For example, other communications links that use host/slave configurations may be used such as FireWire (IEEE 1394), Ethernet (IEEE 802), etc. if desired, and that converter 10 may be configured to provide the appropriate voltage to drive such links. Moreover, converter 10 in device 20 may be configured such that it provides power to charge the battery of a second mobile device rather than power a USB link (e.g., through a communications links rather than driving a communications link (e.g., PDA to PDA, or PDA to digital camera through a communications or power link, etc.)).

Furthermore, it will be appreciated that although the above describes converter 10 as including buck and boost converters, any other suitable DC to DC converters may be implemented in a similar bidirectional configuration, including, but not limited to buck, boost, buck-boost, inverting, flyback, push-pull, H-bridge, Cuk or SEPIC configurations for bidirectional power conversion. In some embodiments, it is desirable to construct converter 10 using configurations that do not require a transformer to reduce size, weight and/or cost.

Figure 2:
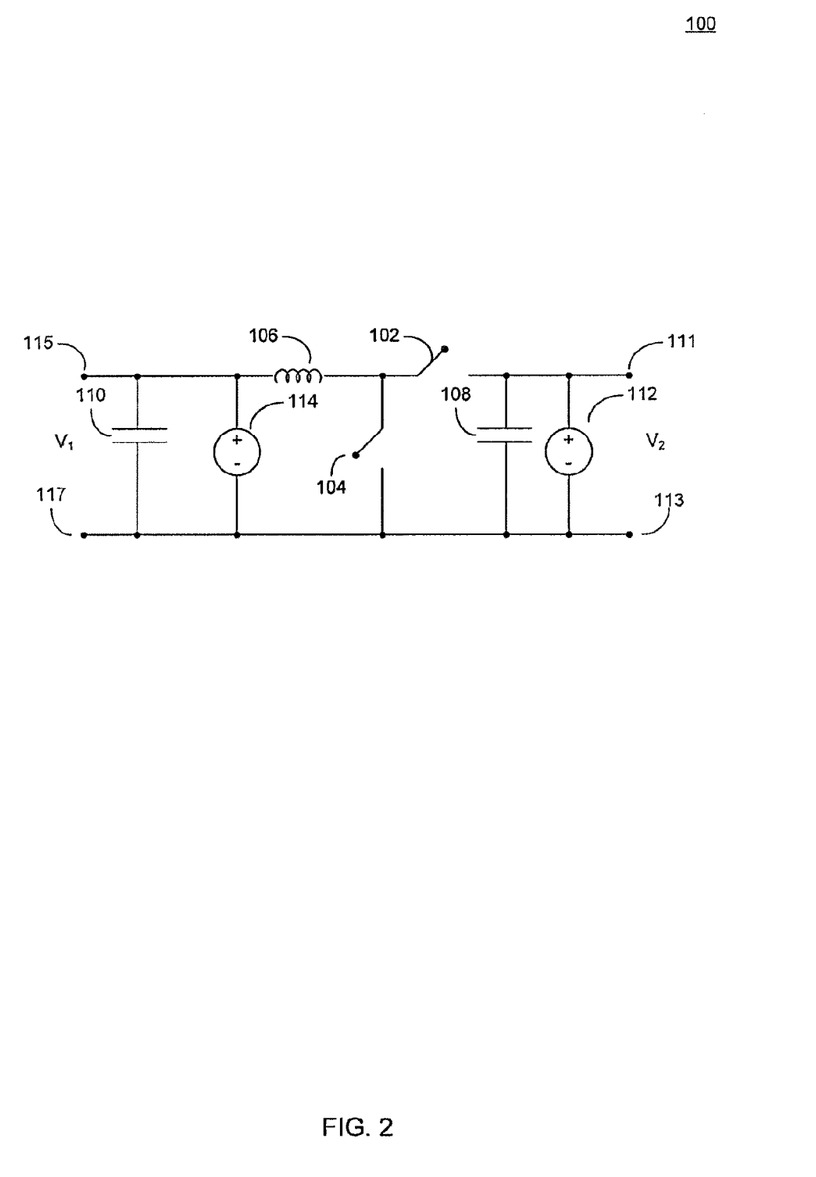
FIG. 2 is a general schematic diagram of an embodiment of a bidirectional power converter in accordance with the principles of the present invention.

One possible implementation of converter 10 is generally illustrated as converter 100 in FIG. 2. As shown, converter 100 includes terminals 111, 113, 115 and 117, switches 102 and 104, inductor 106, and capacitors 108 and 110. Voltage source 114 generally represents an external power source, such as a DC adapter or USB host, but may also represent an external load such as a USB memory stick or other host application. Voltage source 112 generally represents an internal power source, such as a battery or other storage element. Source 112 can act as a load (when it is being charged as the battery), and act as a power source when providing power to an external host application such as the USB memory stick mentioned earlier. Typically, either voltage source 112 or voltage source 114 are actively supplying power to converter 100 at any one given time. Both are shown in converter 100 to provide a comprehensive overview of the converter topology.

In some embodiments, buck/boost mode selection is determined by a combination of user input and conditions on voltage source 112 and 114. If the user enables the converter to function as a buck converter, (e.g., through a switch (not shown)) converter 100 will operate as such if voltage source 112 is currently available. In some applications, voltage source 114 may be present as a battery when buck mode is enabled (e.g., as an external battery being charged). In some embodiments, converter 100 may be configured to operate in a two or three mode configuration. In a two mode configuration, converter 100 may switch between buck and boost modes. In a three mode configuration, converter 100 may switch between buck and boost mode and include a standby mode when neither conversion mode is desired. Such embodiments may employ two or three position switches, respectively, with each switch position corresponding to an operating mode (not shown).

If the user enables converter 100 to function as a boost converter, it will operate as such provided that voltage source 114 is available and substantially no voltage is already present on source 112. This prevents converter 100 from attempting to drive terminals 111 and 113 when input power is already available. However, in some embodiments, some voltage is permissible such as the case where boost mode is used to charge battery 112, which is not fully depleted.

In one embodiment, bidirectional converter 100 is intended for use as a USB dual role device. Dual role devices may act as a host or as a peripheral and can supply or receive power. In some dual role embodiments, the roles may be determined by mode selection circuitry (not shown in FIG. 2). In other embodiments, the input of a user selectable switch as described above may be employed.

In yet other embodiments, the mode of operation may be determined by the type of connector that is connected converter 100 (e.g., in a device 20). For example, a USB cable for On-The-Go applications may have a mini-A plug on one end and a mini-B plug on the other. The USB device typically has a mini-AB receptacle and can mate with either plug. The plugs typically contain an ID pin that designates whether converter 100 will need to operate as a type A device (power source) or a type B device (power sink).

If a mini-B plug is connected to terminals 115 and 117, the ID pin will have a characteristic that allows the mode circuit to select the proper mode of operation (e.g., by detecting a resistance greater than 100 kOhms to ground). The mode selection circuitry then configures converter 100 to operate as a step down converter and provide power from battery 112 to source 114 (or power a communications link such as a USB link).

If, however, a mini-A plug is connected to terminals 115 and 117, the mode selection circuitry senses a different characteristic on the ID pin (e.g., a resistance of less than about 10 ohms to ground). In this case, the mode circuit configures converter 100 to operate as a step up converter and provide a boosted voltage to terminals 111 and 113 and/or charge battery 112.

In one mode of operation, converter 100 may function as a buck converter and convert a voltage supplied by voltage source 112 to a lower level at terminals 115 and 117. When operating in the buck mode, voltage source 114 may be coupled to converter 100 such that it absorbs and/or stores power from battery 112, or, in some embodiments, may be electrically disconnected from converter 100 (not shown). The resulting down converted voltage generated across terminals 115 and 117 may be used to provide power to a mobile device or power a communications link and may be coupled to the appropriate power bus for that purpose.

Assuming source 114 is coupled such that it stores or absorbs power provided by battery 112, converter 100 may operate as follows. Generally speaking, voltage source 112, such as battery constructed of multiple Li-Ion cells, provides power to converter 100. Switches 102 and 104 are controlled such that the converter alternates between charging and discharging phases to provide a desired voltage at terminals 115 and 117. For example, when switch 102 is closed and switch 104 is opened, voltage source 112 is coupled to inductor 106. This causes energy from voltage source 112 to be stored on inductor 106 (i.e., a charging phase) and power to be supplied to terminals 115 and 117 via the increasing current through the inductor. When switch 102 is opened and switch 104 is closed, energy stored on inductor 106 is transferred to the load at terminals 115 and 117 (i.e., a discharging phase). By controlling the duty cycle of the two switches (time one switch is closed with respect to the total time both switches are closed), the amount of energy transferred to a load across terminals 115 and 117 can be adjusted to provide a relatively smooth and regulated output voltage at terminals 115 and 117.

Converter 100, however, may also operate in the reverse direction as a boost converter. For example, assuming source 112 now represents a battery in mobile device 20, and voltage source 114 is an external power source, converter 100 may operate as follows. Similar to the buck converter above, switches 102 and 104 are controlled such that converter 100 alternates between charging and discharging phases to provide a desired voltage. For example, when switch 104 is closed and switch 102 is opened, terminals 111 and 113 are isolated from inductor 106 causing energy to be stored in inductor 106 from source 114 (i.e., a charging phase).

Subsequently, when switch 104 is opened and switch 102 is closed the energy stored in inductor 106 is provided to the load at terminals 111 and 113 (i.e., a discharging phase). In this switching configuration, the voltage at terminals 111 and 113 (and battery 112) is greater than that of source 114. By controlling the duty cycle of the two switches, the amount of energy transferred to the load on terminals 111 and 113 can be adjusted to provide a relatively smooth and regulated output voltage at terminals 111 and 113.

There are several well known methods for controlling the duty cycle of switching converter 100 to provide a regulated output voltage such as Current-Mode control or Voltage-Mode control. In either control method, the main switch (switch 102 in step down mode, switch 104 in step-up mode) is turned ON at the beginning of every period and the output voltage is connected to the inverting terminal of an error amplifier while a reference is connected to the non-inverting terminal (not shown).

In a Voltage-Mode control converter, the output of the error amplifier is compared to a sawtooth ramp. When the ramp voltage exceeds the error amplifier voltage the main switch turns OFF and the synchronous rectifier (switch 104 in step down mode, switch 102 in step up mode) turns ON for the rest of the period. If the output voltage is less than a reference voltage, the output of the error amplifier increases, which in turn increases the duty cycle and thus the output voltage. By adjusting the output of the error amplifier, the duty cycle of the main switch can be increased or decreased to regulate the output voltage.

In Current-Mode control converter, the output of the error amplifier represents the desired inductor current and is compared to the current through the main switch. When the main switch is ON, the inductor current is rising. When the inductor current rises above the output of the error amplifier, the main switch is turned OFF and the synchronous rectifier is turned ON for the rest of the cycle. By adjusting the output of the error amplifier the inductor current can be increased or decreased to regulate the output voltage. In some cases a sawtooth ramp is added to the switch current signal to eliminate a well known instability. The details of these control methods can be found in many switching power supply texts known in the art such as "Switching Power Supply Design" by Abraham I. Pressman.

Thus, as can be seen from the above, a simple bidirectional power converter which uses all (or virtually all) of the same circuit components is provided. Converter 100 is useful for multiple mobile and other applications.

Figure 3:
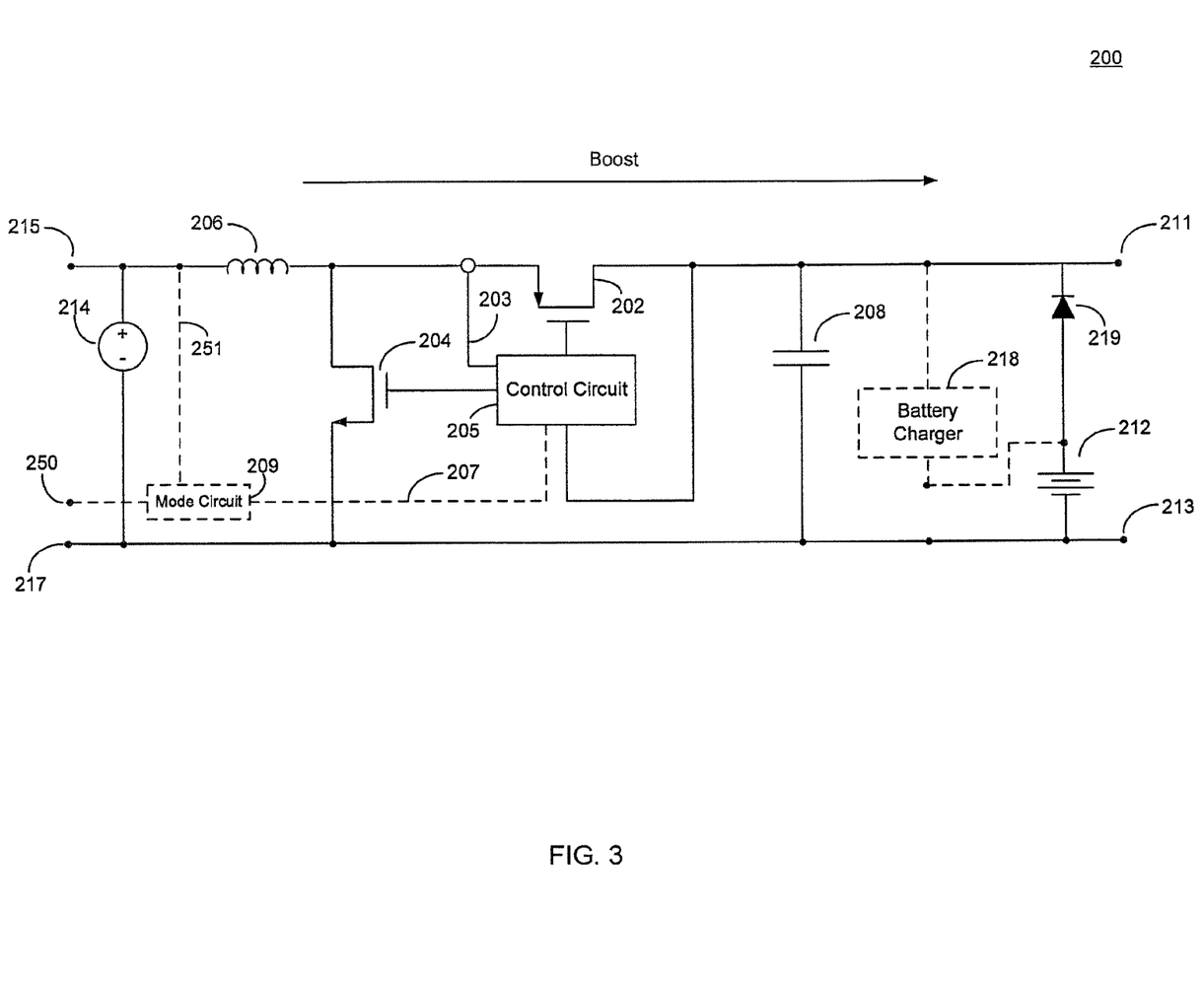
FIG. 3 is a more detailed schematic diagram of the bidirectional power converter of FIG. 2 operating in a step up/boost mode.

One possible specific embodiment of converter 100 constructed in accordance with the principles of the present invention is shown in FIG. 3 as converter 200. Converter 200 illustrates converter 100 operating in boost mode and thus certain components associated with buck mode operation have been omitted for simplicity.

Converter 200 is similar in many respects to the converter shown in FIG. 2 and generally includes components and functional blocks which have been numbered similarly to denote similar functionality and general correspondence. For example, converter 200 includes battery 212 (voltage source 112 in FIG. 2), inductor 206 and capacitor 208 (inductor 106 and capacitor 108 respectively in FIG. 2), voltage source 214 (voltage source 114). PMOS transistor 202 and NMOS transistor 204 (switches 102 and 104, respectively in FIG. 2) and terminals 211, 213, 215, and 217 (terminals 111, 113, 115 and 117 in FIG. 2). Converter 200 also includes control circuit 205, diode 219 and may include optional mode circuit 209 and optional battery charger circuit 218.

In operation, converter 200 may be set to operate in boost mode by an external signal (manual or automatic) and/or internally by sensing signals at terminals 211 and 213 and 215 and 217 and selecting the proper mode of operation (e.g., by comparing signals at these terminals). This may be accomplished by mode circuit 209 which may include comparison, sensing or other circuitry used to determine the appropriate mode of operation. As mentioned above, one way this may be accomplished is by sensing conditions on an ID pin at node 250. Converter 200 may also sense the voltage at node 215 through path 251 with mode circuit 209 to confirm the voltage level is as expected based on conditions sensed at node 250. In some embodiments, if the sensed voltage level at node 215 does not agree with the conditions sensed at node 250, mode selection circuitry 209 may place converter 200 in a standby state, or may rely on the voltage measured at node 215 in making mode selection decisions.

Once boost mode is selected, control circuit 205 generates the control signals used to drive PMOS switch 202 and NMOS switch 204 such that converter 200 operates in boost mode. In some embodiments, control circuit 205 may include control circuitry such as pulse width modulation circuitry and drive circuitry suitable for switching PMOS switch 202 and NMOS switch 204 ON and OFF.

Thus, in operation, control circuit 205 alternates converter 200 between charging and discharging phases to provide a desired regulated output voltage across terminals 211 and 213. For example, when control circuit 205 turns PMOS switch 202 OFF, and NMOS switch 204 ON, voltage source 214 is coupled to inductor 206. This causes energy from voltage source 214 to be stored on inductor 206 via the increasing current through the inductor. When control circuit 205 turns ON PMOS switch 202 and turns OFF NMOS switch 204 inductor 206 discharges and provide energy to battery 212, capacitor 208 and terminals 211 and 213. In some embodiments, converter 200 may include optional battery charging circuitry 218. Charging circuitry 218 may be used to control the charging of battery 212 when voltage source 214 is present to charge the battery. The regulated voltage across terminals 211 and 213 may also be further used to drive a load such as that associated with powering a consumer electronic device. Optional diode 219 provides current from the battery to supply system load across terminals 211 and 213 when voltage source 214 is not present or when the system load exceeds current available from voltage source 214.

By controlling the duty cycle of the two switches, control circuit 205 may adjust the amount of energy transferred to the load to provide a relatively smooth and regulated output voltage at terminals 211 and 213 and to battery 212.

Optional battery charger 218 may further condition the regulated voltage such that it also provides a substantially constant current and constant voltage to battery 212 to facilitate charging. Moreover, in some embodiments, converter 200 may include sensing path 203, which may be used to monitor input current from voltage source 214. Exceeding an input current threshold may cause control circuit 205 to adjust the duty cycle of PMOS switch 202 until input current returns to below the threshold limit.

Figure 4:
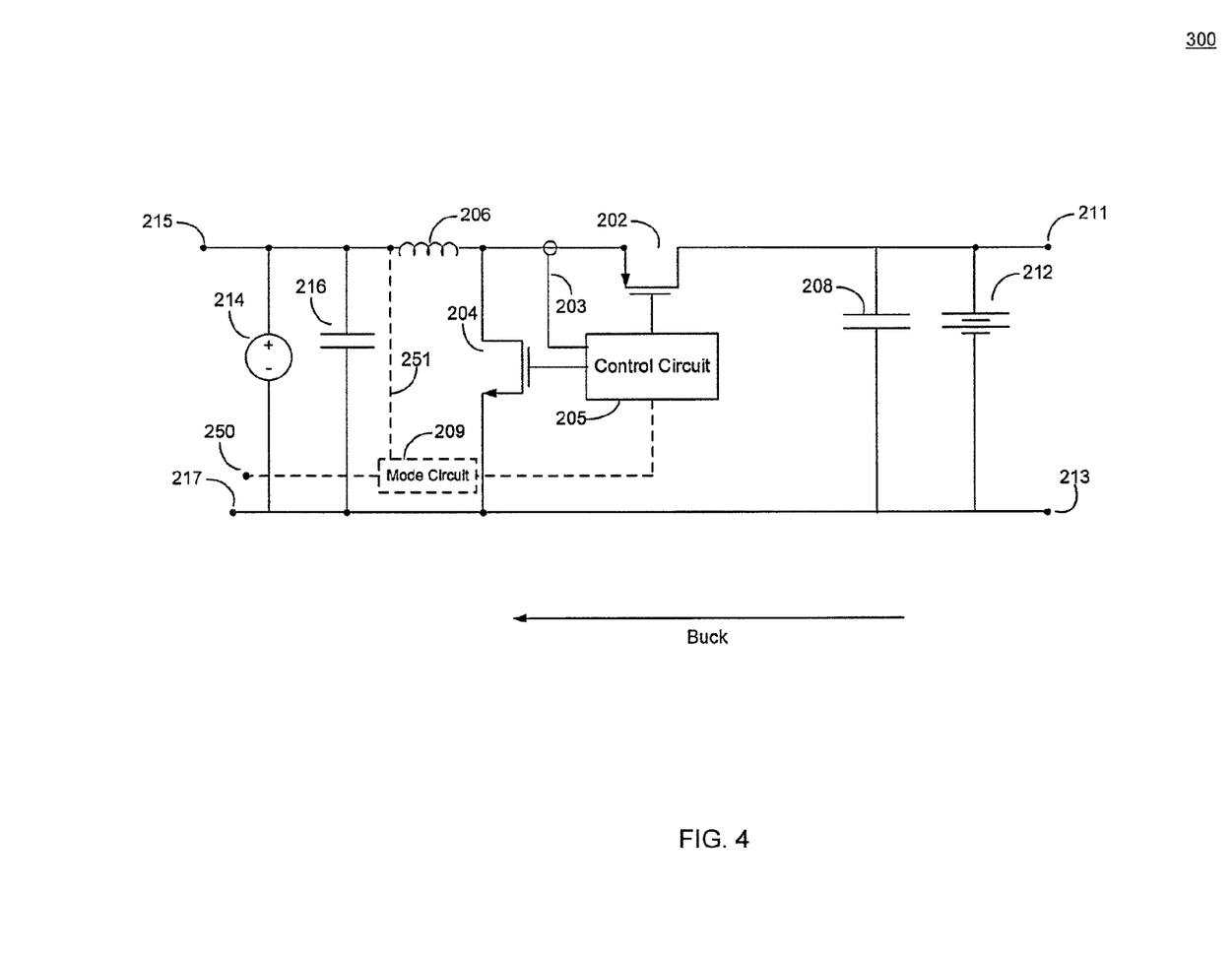
FIG. 4 is a more detailed schematic diagram of the bidirectional power converter of FIG. 2 operating in step down/buck mode.

Referring now to FIG. 4, converter 300 is shown, which is a representation of converter 200, operating in the opposite direction in buck mode. Accordingly, certain components associated with boost mode operation have been omitted for simplicity. Because virtually all the same components are used and perform the same or very similar function, the component designation numbers remain the same.

As in converter 200, converter 300 may be set to operate in buck mode by an external signal (manual or automatic) and/or internally by sensing signals at terminals 211 and 213 and 215 and 217 and selecting the proper mode of operation (e.g., by comparing signals at these terminals). This may be accomplished by mode circuit 209 which may include comparison, sensing or other circuitry used to determine the appropriate mode of operation. As mentioned above, one way this may be accomplished is by sensing conditions on an ID pin at node 250. Converter 300 may also sense the voltage at node 215 through path 251 with mode circuit 209 to confirm the voltage level is as expected based on conditions sensed at node 250. In some embodiments, if the sensed voltage level at node 215 does not agree with the conditions sensed at node 250, mode selection circuitry 209 may place converter 200 in a standby state, or may rely on the voltage measured at node 215 in making mode selection decisions.

Once buck mode is selected, control circuit 205 generates the control signals used to drive PMOS switch 202 and NMOS switch 204 such that converter 300 operates in buck mode. Control circuit 205 alternates converter 300 between charging and discharging phases to provide a desired down converted output voltage across terminals 215 and 217. For example, when control circuit 205 turns PMOS switch 202 ON and NMOS switch 204 OFF, energy from battery 212 is stored on inductor 206.

When control circuit 205 turns OFF PMOS switch 202 and turns ON NMOS switch 204 the energy stored in inductor 206 is discharged and provides a down converted voltage at terminals 215 and 217. The regulated voltage across these terminals may be used to power a communications link, such as a USB link, and/or may be further used to drive another external load such as charge a battery, etc.

In some embodiments, sensing path 203 may be used by control circuit 205 to monitor the output current of converter 300. Exceeding an output current threshold may cause control circuit 205 to adjust the duty cycle of NMOS switch 204 until output current returns to below the threshold limit. For example, such current sensing may be performed to ensure that the current supplied is within the range specified by a communications link, such as a USB link. In addition, it will be understood that while in buck mode, battery 212 may be driving a load at terminals 215 and 217 as well as powering any device (such as mobile device 20) coupled to terminals 211 and 213.

Figure 5:
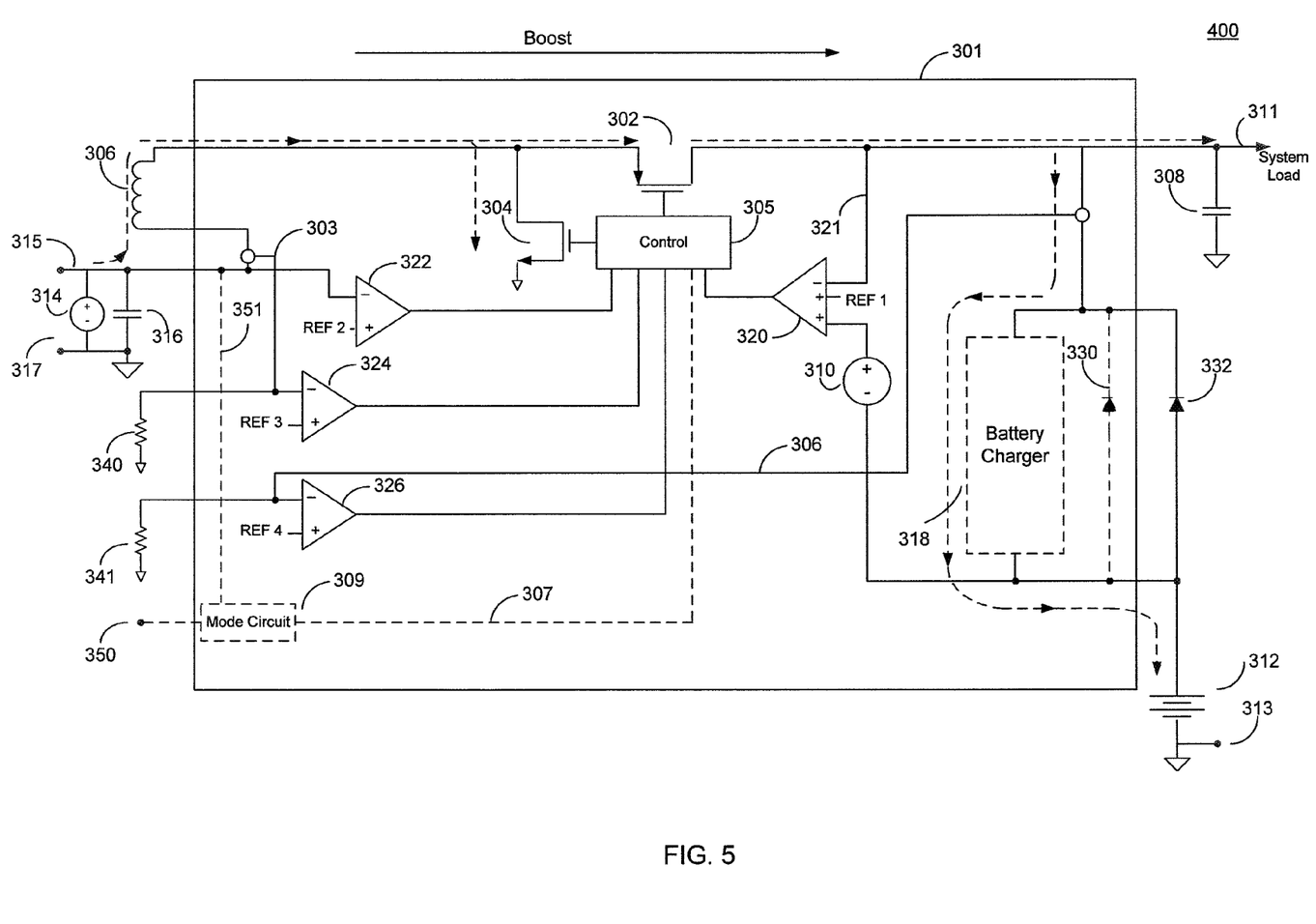
FIG. 5 is a more detailed schematic diagram of the bidirectional power converter of FIG. 2 operating in a step up/boost mode.

Referring now to FIG. 5, a converter 400 is shown, which is a more detailed representation of converter 200 in FIG. 3, operating in boost mode. In some embodiments, converter 400 may be disposed on an integrated circuit 301. Converter 400 is similar in many respects to the converter shown in FIG. 3 and generally includes components and functional blocks which have been numbered similarly to denote similar functionality and general correspondence. For example, circuit 400 includes voltage source 314 (voltage source 214 in FIG. 3), inductor 306 and capacitor 308 (inductor 206 and capacitor 208 respectively in FIG. 3), battery 312 (battery 212 in FIG. 3), PMOS transistor 302 and NMOS transistor 304 (switches 202 and 204, respectively in FIG. 3), control circuit 305 (control circuit 205), optional mode circuit 309 (mode circuit 209), optional battery charging circuit 318 (charger 218) and terminals 311, 313, 315, and 317 (terminals 211, 213, 215 and 217 in FIG. 3). Converter 400 also includes amplifier circuits 320, 322, 324 and 326 and may further include diodes 330 and 332.

In operation, converter 400, like converter 200, may be set to operate in boost mode by an external signal (manual or automatic) or internally by sensing signals at input/output terminals and selecting the proper mode of operation. This may be accomplished by mode circuit 309 to determine the appropriate mode of operation.

For example, mode circuitry 309 may sense conditions at an ID pin coupled to node 350 to determine whether to operate in buck or boost mode. Assuming boost mode characteristics are sensed (e.g. a resistance less than about 10 ohms to ground on the ID pin), mode selection circuitry 309 configures converter 400 as a boost converter. In this case, mode circuit 309 may disable or otherwise turn OFF or disconnect amplifier 322, which is used to sense the output voltage at node 315 when converter 400 operates in buck mode.

Converter 400 may sense the voltage at node 315 through path 351 with mode circuit 309 to confirm the voltage level is as expected based on conditions sensed at node 315. In some embodiments, if the sensed voltage level at node 315 does not agree with the conditions sensed at node 350, mode selection circuitry 309 may place converter 400 in a standby state, or may rely on the voltage measured at node 315 in making mode selection decisions.

If a voltage less than that of battery 312 is present on source 314, as determined by a comparator in mode selection circuitry 309, converter 400 may automatically operate as a step-up converter and charge the battery and provide power to terminals 311 and 313. In some embodiments, an optional microcontroller (not shown) or user can also use path 350 to adjust the power settings of converter 400 (such as between 100 mA and 500 mA modes for USB embodiments), or put converter 400 in standby through logic inputs to the mode selection circuitry (not shown).

Once boost mode is selected, control circuit 305 generates the control signals used to drive PMOS transistor 302 and NMOS transistor 304 such that converter 400 operates in boost mode. Although shown as PMOS and NMOS transistors, switches 302 and 304 may be implemented as any suitable semiconductor or armature type switches with any suitable polarity or configuration. In the case where switch 302 is a PNP power transistor, Schottky diodes may be coupled in parallel to avoid transistor saturation in one or both directions. Moreover, in some embodiments, control circuit 305 may include control circuitry such as pulse width modulation circuitry and drive circuitry suitable for switching PMOS transistor 302 and NMOS transistor 304 ON and OFF.

In operation, converter 400 may receive a rectified input voltage at terminal 315 from a wall socket or other power source 314. Control circuit 305 operates in conjunction with amplifiers 320, 324 and 326 and alternates converter 400 between charging and discharging phases to provide a desired regulated output voltage across terminals 311 and 313 within a desired input current range. When control circuit 305 turns PMOS transistor 304 ON, and NMOS transistor 302 OFF, voltage source 314 is coupled to inductor 306. This causes energy from voltage source 314 to be stored on inductor 306 due to the increasing inductor current.

When control circuit 305 turns ON PMOS transistor 302 and turns OFF NMOS transistor 304, inductor 306 discharges and provides energy to terminals 311 and 313. The current paths from input 315 to inductor 306, via PMOS transistor 302, and from ground to inductor 306, via NMOS transistor 304, are shown by the top most dotted lines. Amplifier 320 compares the output voltage at terminal 311 with a preset reference signal REF1 (which is typically a preset value that sets the output voltage).

If the output voltage is less than REF1, amplifier 320 will provide an error signal that causes control circuit 305 to increase the duty cycle of PMOS transistor 302 and provide more power to terminals 311 and 313 until the output voltage is substantially equal to REF1. Conversely, if the output voltage is greater than REF1, amplifier 320 will provide an error signal that causes control circuit 305 to decrease the duty cycle of PMOS transistor 302 and reduce power to terminals 311 and 313 until the output voltage is substantially equal to REF1.

Embodiments of converter 400 that include optional battery charging circuitry 318 and ideal diode 330 may further condition the output voltage with circuit 318 such that a substantially constant current and constant voltage is provided to output terminal 311 (that is typically somewhat above the voltage provided by battery 312 to facilitate charging). In this case, one of the non-inverting terminals of amplifier 320 is connected to the battery 312 and a reference voltage 310 to provides a regulation point for the output voltage at terminal 311. That regulation point is generally set slightly higher than the battery voltage (e.g., 0.3 volts higher, provided by the reference voltage 310) to allow for optimum operation of the battery charging circuitry 318.

One benefit of embodiments of converter 400 that include battery charging circuit 318 and ideal diodes 330 is that such embodiments permit the voltage at output terminal 311 to be different from the voltage of battery 312. This allows converter 400 to supply the required voltage at terminal 311 necessary to operate the external system (such as mobile device) while battery 312 is charging (and at a lower voltage level). Thus, the system coupled to terminal 311 may operate substantially immediately when the appropriate power signal is applied to terminal 315. However, embodiments of converter 400 that do not include battery charging circuitry 318 (and ideal diodes 330 and 332) may require battery 312 to first be charged to the voltage level required by the system load before a sufficient voltage is available to power the system load.

Generally speaking, amplifier 320 will set the regulation point based on the signals at both non-inverting inputs (e.g., will regulate to the higher of the two applied voltages). The current path from input 315 to battery 312 is generally shown by the downward dotted line that passes through charger 318. Current flow directly into the battery from inductor 306 is blocked by diodes 330 and 332. A suitable such charging circuit may be found in the LTC 4088. In this operating mode, the regulated voltage across terminals 311 and 313 may also be further used to drive a system load such as that associated with powering a consumer electronic device.

By controlling the duty cycle of the two switches, amplifier 320 generates an error signal that causes control circuit 305 to adjust the amount of voltage provided to the load on terminals 311 and 313, providing a relatively smooth and regulated output voltage.

In addition, as shown, converter 400 may further include amplifier 324 and sensing path 303, which may be used to monitor input current from voltage source 314 through resistor 340 (which is compared to the threshold set by reference voltage REF3). Exceeding the set input current threshold may cause amplifier 324 to produce an error signal that causes control circuit 305 to reduce the duty cycle of PMOS transistor 302 until input current returns to a level below the threshold limit. If the current drawn by the system load at terminal 311 exceeds the current available from converter 400 due to input current limiting, battery 312 may supply the difference through internal diode 330 and external diode 332.

Moreover, embodiments of converter 400 that do not include battery charger 318 (and ideal diode 330) may include amplifier 326 and sensing path 306 instead as a means to monitor and regulate the current provided to battery 312. In such embodiments, charger circuit 318 may be replaced by a short circuit which allows current to flow substantially directly into battery 312 from PMOS 302. Current may be monitored and regulated by acquiring a signal from output terminal 311 through path 306 and passing through it resistor 341 to develop a voltage signal proportional to battery current (which is compared to the threshold set by reference voltage REF4 coupled to amplifier 326). Exceeding the battery current threshold causes amplifier 326 to produce an error signal prompting control circuit 305 to reduce the duty cycle of PMOS transistor 302 until battery current returns to a level below the set threshold limit. This help to ensure that battery 312 is not overcharged or damaged.

Figure 6:
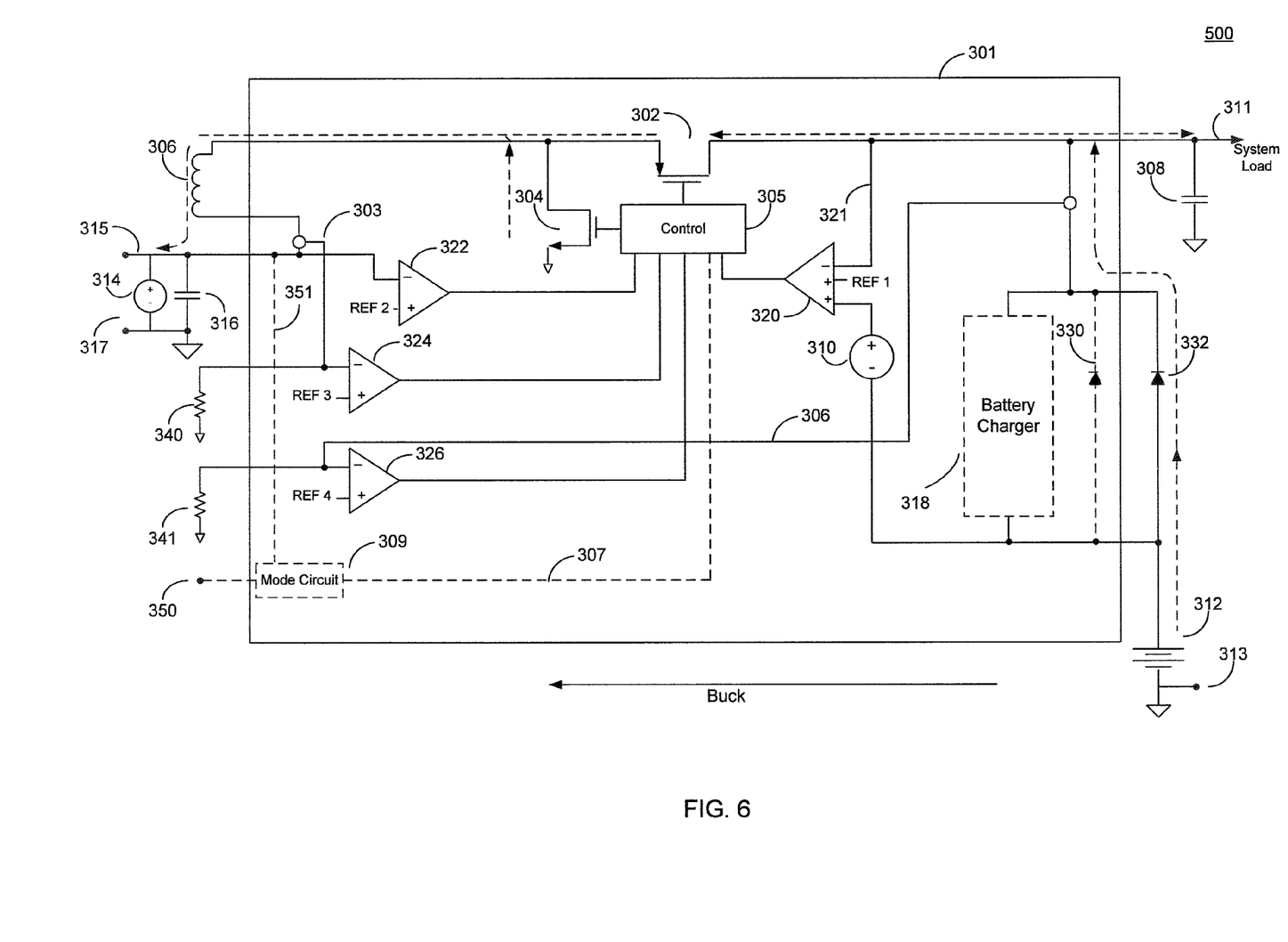
FIG. 6 is a more detailed schematic diagram of the bidirectional power converter of FIG. 2 operating in a step down/buck mode.

Referring now to FIG. 6, converter 500 is shown, which is a more detailed representation of converter 300 in FIG. 4, operating in buck mode. In some embodiments, converter 500 may be disposed on an integrated circuit package 301. Converter 500 is similar in many respects to the converter shown in FIG. 4 and generally includes components and functional blocks which have been numbered similarly to denote similar functionality and general correspondence. For example, circuit 500 includes battery 312 (battery 212 in FIG. 4), inductor 306 and capacitor 308 (inductor 206 and capacitor 208 respectively in FIG. 4), PMOS transistor 302 and NMOS transistor 304 (switches 202 and 204, respectively in FIG. 4), control circuit 305 (control circuit 205), mode circuit 309 (mode circuit 209) and terminals 311, 313, 315, and 317 (terminals 211, 213, 215 and 217 in FIG. 3). Converter 500 also includes amplifier circuits 320, 322 and 324 and may further include diodes 330 and 332.

In operation, converter 500, like converter 300, may be set to operate in buck mode by an external signal (manual or automatic) or internally by sensing signals at input/output terminals and selecting the proper mode of operation.

For example, mode circuitry 309 may sense conditions at an ID pin coupled to node 350 to determine whether to operate in buck or boost mode. Assuming buck mode characteristics are sensed (e.g. a resistance of more than about 100K ohms to ground), mode selection circuitry 309 configures converter 500 as a buck converter. In some embodiments, mode circuit 309 may disable or turn OFF amplifier 326 when converter 500 operates in buck mode.

Converter 500 may also sense the voltage at node 315 through path 351 with mode circuit 309 to confirm the voltage level is as expected based on conditions sensed at node 350. In some embodiments, if the sensed voltage level at node 315 does not agree with the conditions sensed at node 350, mode selection circuitry 309 may place converter 500 in a standby state, or may rely on the voltage measured at node 315 in making mode selection decisions.

To prevent accidental back-driving of an external input supply on terminals 315 and 317 during buck mode, mode circuit 309 may determine if there is already more than about 4.3V on the terminals when the ID pin has more than about 100K ohms to ground. If such voltage is already present, mode circuit 309 will not enable the converter. This case is possible if a mini-B plug with a faulty ID pin is connected to terminals 315 and 317.

Although shown as PMOS and NMOS transistors, switches 302 and 304 may be implemented as any suitable semiconductor or armature type switches with any suitable polarity or configuration. In the case where switch 302 is a PNP power transistor, Schottky diodes may be coupled in parallel to avoid transistor saturation in one or both directions. Moreover, in some embodiments, control circuit 305 may include control circuitry such as pulse width modulation circuitry and drive circuitry suitable for switching PMOS transistor 302 and NMOS transistor 304 ON and OFF.

In operation, converter 500 receives an input voltage at terminal 311 from battery 312. Control circuit 305 operates in conjunction with amplifiers 322 and 324 and alternates converter 500 between charging and discharging phases to provide a desired down converted output voltage across terminals 315 and 317. For example, when control circuit 305 turns PMOS transistor 302 ON and NMOS transistor 304 OFF energy from battery 314 is stored on inductor 306 (i.e., a charging phase). When control circuit 305 turns OFF PMOS transistor 302 and turns ON NMOS transistor 304 the energy stored in inductor 306 is provided to the load and produces the down converted voltage at terminals 315 and 317. The current path from battery 312 to inductor 306 is shown by upward bound dotted lines passing through diodes 330 and 332. Diodes 330 and 332 ideally have a low forward voltage drop to minimize power loss. Though shown as diodes, 330 and 332 may be implemented using MOSFETs and comparators to more accurately approximate the "ideal diode" function. The "Ideal diode" function described is practiced on the LTC4088 manufactured by Linear Technology Corporation of Milpitas Calif., the assignee of this patent application.

Amplifier 322 compares the output voltage of converter 500 with a preset reference signal REF2. If the output voltage is less than REF2, amplifier 322 will generate an error signal that causes control circuit 305 to increase the duty cycle of PMOS transistor 302 and provide more power to terminals 315 and 317 until the output voltage substantially equals REF2. If the output voltage is greater than REF2, amplifier 322 will generate an error signal that causes control circuit 305 to decrease the duty cycle of PMOS transistor 302 and reduce power to terminals 315 and 317 until the output voltage substantially equals REF2. By controlling the duty cycle of the two switches, amplifier 322 adjusts the amount of energy transferred to the load on terminals 315 and 317 providing a relatively smooth and regulated buck output voltage at terminals 315 and 317.

The regulated voltage across terminals 315 and 317 may be used to power a communications link, such as a USB link, and/or may be further used to drive a load such an audio speaker, etc. The current path from battery 312 to output terminal 315 is shown by upward bound dotted lines passing through diodes 330 and 332, through inductor 306 and PMOS transistor 302 to output terminal 315. In this operating mode, the voltage provided by battery may also be further used to drive a load such as that associated with powering a consumer electronic device at terminal 315.

Moreover, in some embodiments, converter 500 may include sensing path 303 and amplifier 324, which may be used to monitor the output current of converter 500 through resistor 340 (which is compared to the threshold set by REF3). Exceeding an output current threshold may cause amplifier 322 to reduce the duty cycle of PMOS transistor 302 until output current returns to below the threshold limit. For example, such current sensing may be performed to ensure that the current supplied is within the range specified by a communications link, such as a USB link.

In some embodiments, an optional microcontroller (not shown) or user can also use path 350 to adjust the power settings of converter 500 (such as between 100 mA and 500 mA modes for USB embodiments), or put converter 500 in standby through logic inputs to the mode selection circuitry (not shown).

Although preferred embodiments of the present invention have been disclosed with various circuits connected to other circuits, persons skilled in the art will appreciate that it may not be necessary for such connections to be direct and additional circuits may be interconnected between the shown connected circuits without departing from the spirit of the invention as shown. Persons skilled in the art also will appreciate that the present invention can be practiced by other than the specifically described embodiments. The described embodiments are presented for purposes of illustration and not of limitation, and the present invention is limited only by the claims which follow.

What is claimed is:

1. A bi-directional power converter, which operates as a step up converter in a first direction and a step down converter in a second direction, comprising:
   one reactive element for storing energy when operating in the first direction and the second direction;
   a plurality of switching elements for selectively coupling the one reactive element to one of two or more power sources; and
   mode selection circuitry for selectively coupling the bi-directional power converter to a first power source when operating as a step up converter and to a second power source when operating a step down converter, such that when the bi-directional power converter is operating as the step down converter, the bi-directional power converter is configured to deliver power through a power component of a communications link; the communication link being coupled to the first power source configured for supplying power to the power converter when the power converter is operating as the step up converter, and the second power source being a battery configured for supplying power to the power converter when the power converter is operating as the step down converter, the power converter being configured for providing power to a first device at an output of the power converter when the power converter is operating as the step down converter, and
   the power converter being configured for providing power from the reactive element to a second electronic device when the power converter is operating as the step up converter.

2. The bidirectional power converter of claim 1 configured to provide power to a universal serial bus (USB) link when operating as a step down converter.

3. The bi-directional power converter of claim 1 configured to provide power sufficient to operate a mobile device when operating as a step up converter.

4. The bi-directional power converter of claim 1 further comprising a battery charging circuit.

5. The bi-directional power converter of claim 4 wherein the battery charging circuit is used to regulate power provided to an energy storage device when the bi-directional power converter operating as a step up converter.

6. The bi-directional power converter of claim 1 further comprising control circuitry coupled to the mode selection circuitry, the control circuitry controlling the plurality of switches such that the bi-directional power converter operates in either the step up or step down mode in response to a mode selection signal provided by the mode selection circuitry.

7. The bi-directional power converter of claim 6 wherein the control circuitry controls the duty cycle of at least one of the plurality of switches such that the bi-directional power converter provides a desired regulated output voltage.

8. The bi-directional power converter of claim 1 wherein the mode selection circuitry further comprises sensing circuitry.

9. The bi-directional power converter of claim 8 wherein the sensing circuitry includes a comparison circuit.

10. The bi-directional power converter of claim 1 wherein the first power source is a power adapter.

11. The bi-directional power converter of claim 1 wherein the battery is a battery of a mobile device.

12. The bi-directional power converter of claim 1 further comprising mode selection circuitry coupled to the control circuitry for selectively coupling the bi-directional power converter to a first power source when operating as the boost converter and to a second power source when operating as the buck converter.

13. The bi-directional power converter of claim 12 wherein the control circuitry controls the duty cycle of at least one of the plurality of switches such that the bi-directional power converter provides a desired regulated output voltage.

14. The bi-directional power converter of claim 12 wherein the mode selection circuitry further comprises sensing circuitry.

15. The bi-directional power converter of claim 14 wherein the sensing circuitry includes a comparison circuit.

16. The bi-directional power converter of claim 1 wherein voltage provided by the battery is used for powering the electronic device.

17. A bi-directional DC to DC power converter, which operates as a boost converter in a first direction and a buck converter in a second direction, comprising:
   one reactive element for storing energy when operating in either the first direction or the second direction;
   a plurality of switching elements for selectively coupling the one reactive element to one of two or more power sources; and
   control circuitry controlling the plurality of switches such that the bi-directional power converter is supplied by a first power source to operate as the boost converter, or supplied by a second power source to operate as the buck converter, such that when the bi-directional power converter is operating as the buck converter, the bi-directional power converter is configured to deliver power through a power component of a communications link coupled to the first power source,
   wherein the control circuitry is configured to determine whether to operate the converter in a buck mode or in a boost mode based on a type of connector coupled to the power converter,
   the second power source is a battery, and
   the power converter being configured for providing power from the reactive element to an electronic device at an output of the power converter when the power converter is operating as the boost converter.

18. The bi-directional power converter of claim 17 configured to provide power to a universal serial bus (USB) link when operating as a buck converter.

19. The bi-directional power converter of claim 17 configured to provide power sufficient to operate a mobile device when operating as a boost converter.

20. The bi-directional power converter of claim 17 further comprising a battery charging circuit.

21. The bi-directional power converter of claim 20 wherein the battery charging circuit is used to regulate power provided to an energy storage device when the bi-directional power converter operating as a boost converter.

22. The bi-directional power converter of claim 17 wherein the second power source is a battery of a mobile device.

* * * * *